United States Patent [19]
Mitzaki

[11] Patent Number: 5,793,124
[45] Date of Patent: Aug. 11, 1998

[54] UNINTERRUPTIBLE POWER SUPPLY CONTROL SYSTEM EQUIPPED WITH TIMER MECHANISM

[75] Inventor: Yoshihiro Mitzaki, Shimodate, Japan

[73] Assignee: ISA Co, Ltd., Tokyo

[21] Appl. No.: 709,281

[22] Filed: Sep. 6, 1996

[30] Foreign Application Priority Data

Jan. 26, 1996 [JP] Japan .................. 8-011333

[51] Int. Cl.$^6$ ...................... H02J 3/14
[52] U.S. Cl. .............. 307/66; 307/64; 307/18; 307/23; 307/86; 307/38; 307/39; 395/750; 364/707
[58] Field of Search ............... 307/18, 19, 20, 307/23, 24, 29, 38, 39, 64, 66, 80, 81, 85, 86, 125, 126, 130, 131, 139, 140, 141, 141.4; 395/750, 200.02; 361/195, 196; 364/273, 273.1, 273.2, 273.3, 273.4, 273.5, 948.4, 948.5, 948.6, 948.7, 948.8, 948.9, 948.91, 492, 707; 365/226, 227, 228, 229

[56] References Cited

U.S. PATENT DOCUMENTS

| | | | |
|---|---|---|---|
| 3,980,935 | 9/1976 | Worst | 365/229 |
| 4,110,632 | 8/1978 | Wyland | 307/141 |
| 4,125,782 | 11/1978 | Pollnow, Jr. | 307/38 |
| 4,232,377 | 11/1980 | Tallman | 307/150 |
| 4,279,012 | 7/1981 | Beckedorff et al. | 307/141.4 |
| 4,315,162 | 2/1982 | Ferguson | 307/66 |
| 4,413,220 | 11/1983 | Waineo | 307/18 |
| 4,575,679 | 3/1986 | Chung et al. | 307/39 |
| 4,673,826 | 6/1987 | Masson | 307/66 |
| 4,677,310 | 6/1987 | Midorikawa et al. | 307/64 |
| 4,716,463 | 12/1987 | Stacy et al. | 364/707 |
| 4,719,364 | 1/1988 | Pequet et al. | 307/141 |
| 4,789,790 | 12/1988 | Yamanaka | 307/66 |
| 4,908,523 | 3/1990 | Snowden et al. | 307/66 |
| 5,272,386 | 12/1993 | Kephart | 307/141 |
| 5,375,246 | 12/1994 | Kimura et al. | 395/750 |
| 5,381,554 | 1/1995 | Langer et al. | 395/750 |
| 5,406,272 | 4/1995 | Fang | 365/228 |
| 5,502,689 | 3/1996 | Peterson et al. | 364/707 |
| 5,534,734 | 7/1996 | Pugh et al. | 307/66 |
| 5,542,035 | 7/1996 | Kikinis et al. | 395/750 |
| 5,604,708 | 2/1997 | Helms et al. | 365/224 |

*Primary Examiner*—William M. Shoop, Jr.
*Assistant Examiner*—Peter Ganjian
*Attorney, Agent, or Firm*—Ostrolenk, Faber, Gerb & Soffen, L.L.P.

[57] ABSTRACT

An uninterruptible power supply control system of for controlling power supply to an internet type apparatus, a CPU type apparatus requiring a shutdown processing and a printer type apparatus not requiring the shutdown processing. The uninterruptible power supply control system comprises an uninterruptible power supply device which is connected to a power source and arranged to be supplied with power from a battery. The uninterruptible power supply device is arranged to output a shutdown signal to the CPU type apparatus when a power service interruption occurs. The CPU type apparatus makes its shutdown processing in response to the shutdown signal. The internet type apparatus is allowed to be directly electrically connected to the battery so that the internet type apparatus is kept in an uninterrupted power supply condition. The CPU type apparatus is allowed to be electrically connected to the battery through a timer mechanism having a scheduling function so that the CPU type apparatus can be kept in the uninterrupted power supply condition. Additionally, the printer type apparatus is allowed to be electrically connected to the power source through the timer mechanism so that the printer type apparatus is prevented from largely consuming power.

8 Claims, 6 Drawing Sheets

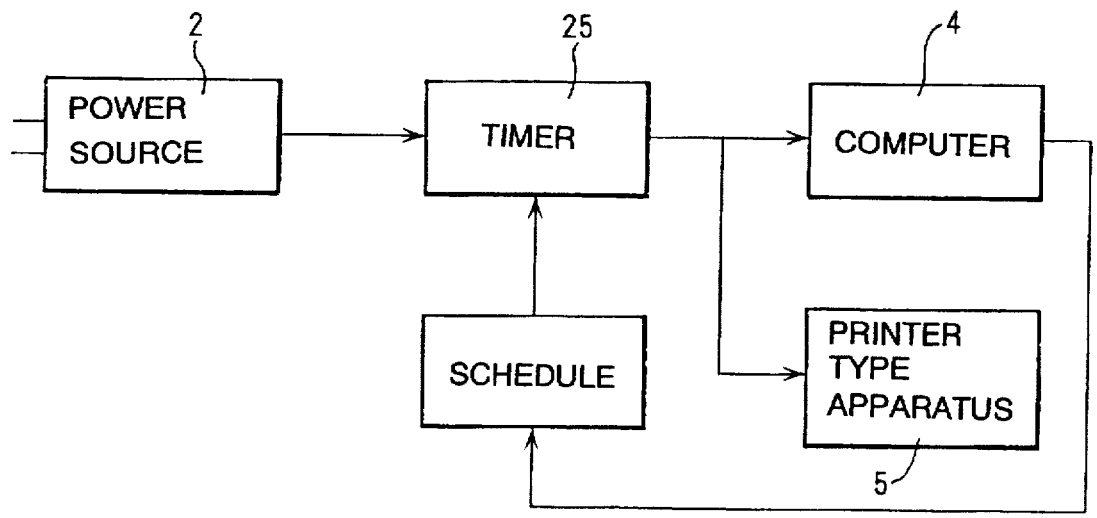
FIG. 7 [PRIOR ART]
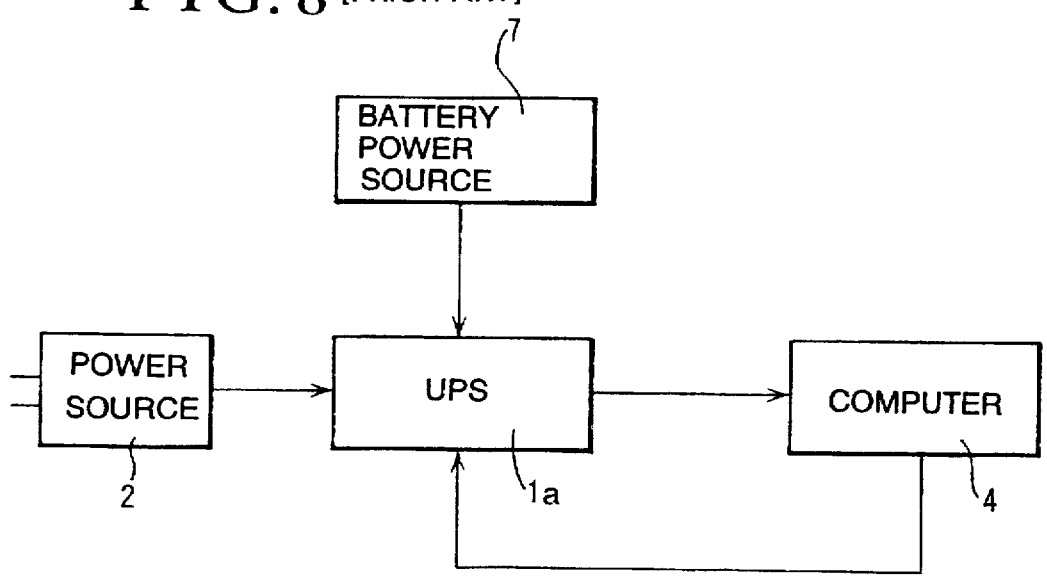
FIG. 8 [PRIOR ART]

UNINTERRUPTIBLE POWER SUPPLY CONTROL SYSTEM EQUIPPED WITH TIMER MECHANISM

BACKGROUND OF THE INVENTION

1. Field of the Invention

This invention relates to an uninterruptible power supply control system equipped with a timer mechanism, for smoothly automatically supplying electric power to a local area network (LAN), computers, printers, copying machines, general business machines and the like even when power failure such as power service interruption occurs, and more particularly to the uninterruptible power supply control system for smoothly accomplishing a shutdown (SD) processing for the computers or the like in order to prevent breakage of data in the computers and unnecessary consumption of power of a battery during a scheduling processing or in an inoperative condition of the computers, or when recovery of power service interruption is not made.

2. Description of the Prior Art

In order to electrically connect a commercial or private owner source with a computer and general business machines such as a printer, circuit arrangements as shown in FIGS. 7 and 8 have been generally used. In the circuit arrangement of FIG. 7, a timer 25 is provided between a power source 2 and apparatuses such as a computer 4 and a printer 5. A term scheduling is prepared by a software in the computer 4 so as to control the timer 25. Under the action of the timer 25, a scheduled term operation of these apparatuses is accomplished.

In the circuit arrangement of FIG. 8, a UPS (uninterruptible power supply device) 1a is provided between the power source 2 and the computer 4, in which power supply is changed over from a usual power source to a battery power source housed in the UPS 1a thereby accomplishing backup of the power supply. Upon this backup of the power supply, data processing in the computer is made manually or automatically, and then a shutdown of the computer 4 storing data is accomplished.

Here, the general business machines such as the printer 5 and the like have usually not necessarily required to continuously work for 24 hours without stopping, and therefore the scheduled term operation of them has been commonly made as discussed above. However, such scheduled operation of the computer has hardly made from the view point of ensuring protection of data in the computer. In order to protect the data stored in the computer when a power service interruption occurs, control using the above-mentioned UPS has been employed. The UPS has been conventionally used only for the computer and has not been used for the general business machines. Additionally, the conventional scheduled term operation of the apparatuses are accomplished by the software in the computer, and therefore a grade(version)-up of the software in the computer is necessary in case of revising an operating system (OS) of the software. This unavoidably raises an operation cost of the computer.

Otherwise, in case that the computer is worked for 24 hours without stopping, unnecessary data are written little by little in the memory of the computer, and therefore a computer runaway problem may arise. Additionally, due to such continuous operation of the computer for a long time including a time in which the computer is not in operation, the apparatuses is lowered in safety in which, for example, a network print server or the like may make its thermal runaway; shortened in life; and high in electric power consumption thereby raising electric power rate.

SUMMARY OF THE INVENTION

It is an object of the present invention is to provide an improved uninterruptible power supply control system equipped with a timer mechanism, which can improve safety of and save electric power in a network system including computers and general business machines.

Another object of the present invention is to provide an improved uninterruptible power supply control system equipped with a timer mechanism, which can make a scheduled term operation of a LAN, computers and general business machines such as a printer, while maintaining LAN type and WAN type apparatuses (which are not allowed to be stopped even temporarily) in an operative condition and protecting data in the apparatuses from being damaged owing to power failure such as power service interruption.

A further object of the present invention is to provide an improved uninterruptible power supply control system equipped with a timer mechanism, which improves safety of computers and general business machines such as a printer and prolongs life of the sames by automatically stopping them for a time to be not required to operate.

A still further object of the present invention is to provide an improved uninterruptible power supply control system equipped with a timer mechanism, which makes possible it to apply a UPS (which has been conventionally seemed to be used only for a computer) to general business machines, while making possible it to accomplish a scheduled term operation of computers and the general business machines.

An uninterruptible power supply control system of the present invention is for a first apparatus, a second apparatus requiring a shutdown processing and a third apparatus not requiring the shutdown processing. The uninterruptible power supply control system comprising an uninterruptible power supply device which is connected to a power source and arranged to be supplied with power from a battery. The uninterruptible power supply device includes means for outputting a shutdown signal to the second apparatus when a power failure occurs, the second apparatus making its shutdown processing in response to the shutdown signal. The first apparatus is allowed to be directly electrically connected to the battery so that the first apparatus is kept in an uninterrupted power supply condition. The second apparatus is allowed to be electrically connected to the battery through a timer mechanism having a scheduling function so that the second apparatus can be kept in the uninterrupted power supply condition. Additionally, the third apparatus is allowed to be electrically connected to the power source through the timer mechanism so that the third apparatus is prevented from largely consuming power.

According to the uninterruptible power supply control system of the present invention, an internet type apparatus (the first apparatus) can be operated in an uninterrupted power supply condition even when a power failure such as a power service interruption occurs, thereby completely protecting the internet type apparatus from its various damages. Additionally, a computer (the second apparatus) and a business machine (the third apparatus) which require a relatively high power consumption are stopped in operation thereby largely saving power consumption. The computer can be controlled to be shut down under the shutdown processing of the uninterruptible power supply device after a data processing is completed, thus completely protecting the data in the computer. Additionally, the computer and the business machine can be subjected to a scheduling processing made under the action of the timer mechanism having the scheduling function, and therefore they are operated only for a time required thereby considerably saving electric power. Thus, the uninterruptible power supply control system of the present invention greatly contributes to public interests which are now eagerly desired to be protected.

BRIEF DESCRIPTION OF THE DRAWINGS

FIG. 7 is a circuit diagram of a conventional circuit arrangement for controlling computers and the like; and FIG. 8 is a circuit diagram of another conventional circuit arrangement for controlling computers and the like.

DETAILED DESCRIPTION OF THE INVENTION

Figure 1:
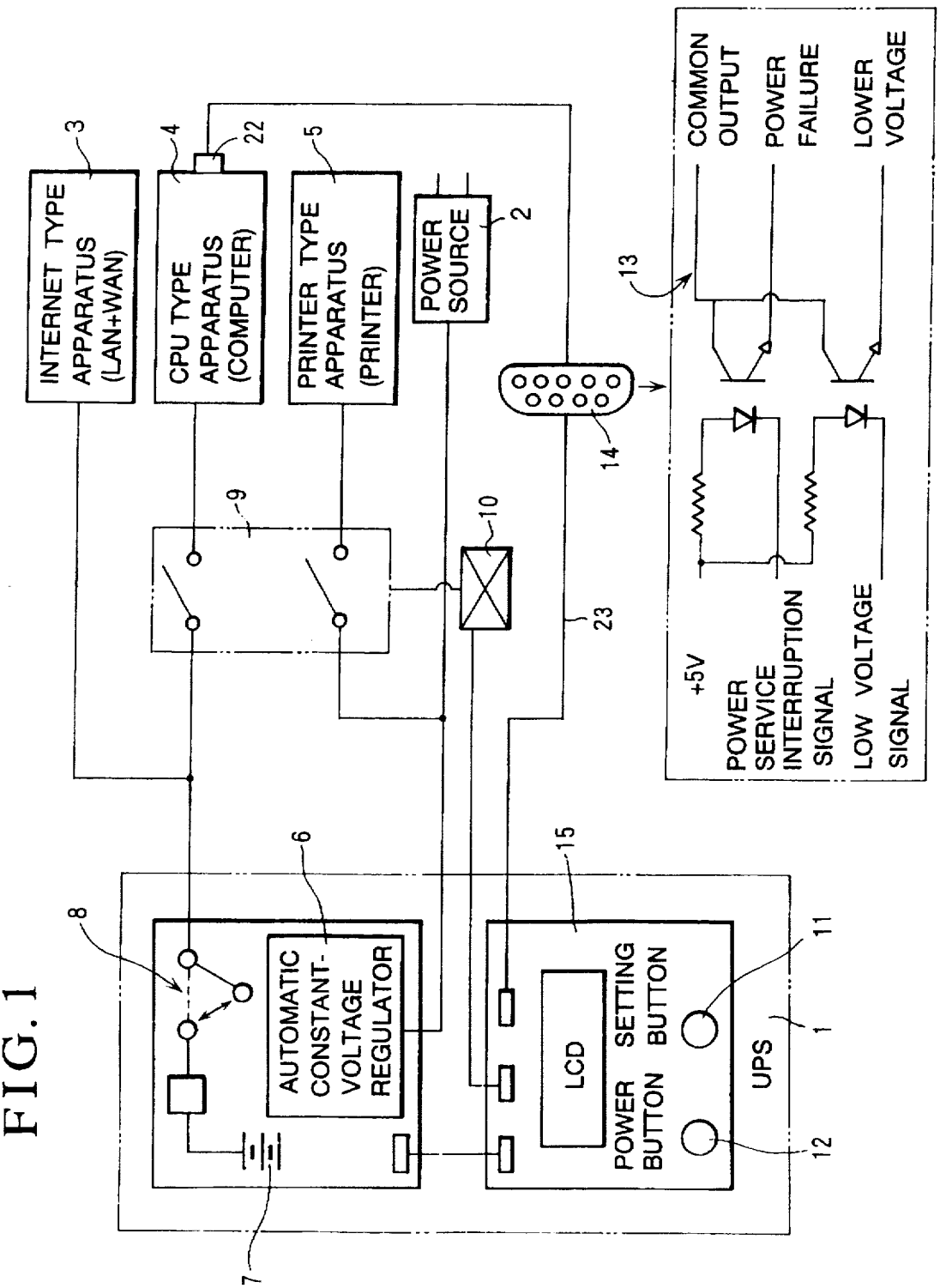
FIG. 1 is a schematic circuit diagram of an embodiment of an uninterruptible power supply control system according to the present invention.

Referring now to FIGS. 1 to 4, and more specifically to FIG. 1, an embodiment of an uninterruptible power supply control system equipped with a timer mechanism, according to the present invention is illustrated. The control system comprises a UPS (uninterruptible power supply device) 1 which is electrically connected to a LAN (local area network) 3 as an internet type apparatus and a computer 4 as a CPU (central processing unit) type apparatus. The internet type apparatus may include a WAN (wide area network). The UPS I is further electrically connected to a printer 5 (or the like) as a printer type apparatus. The UPS I includes an automatic constant-voltage regulator 6 for accomplishing automatic constant-voltage regulation for voltage to be supplied to the LAN 3 and the like.

Figure 2:
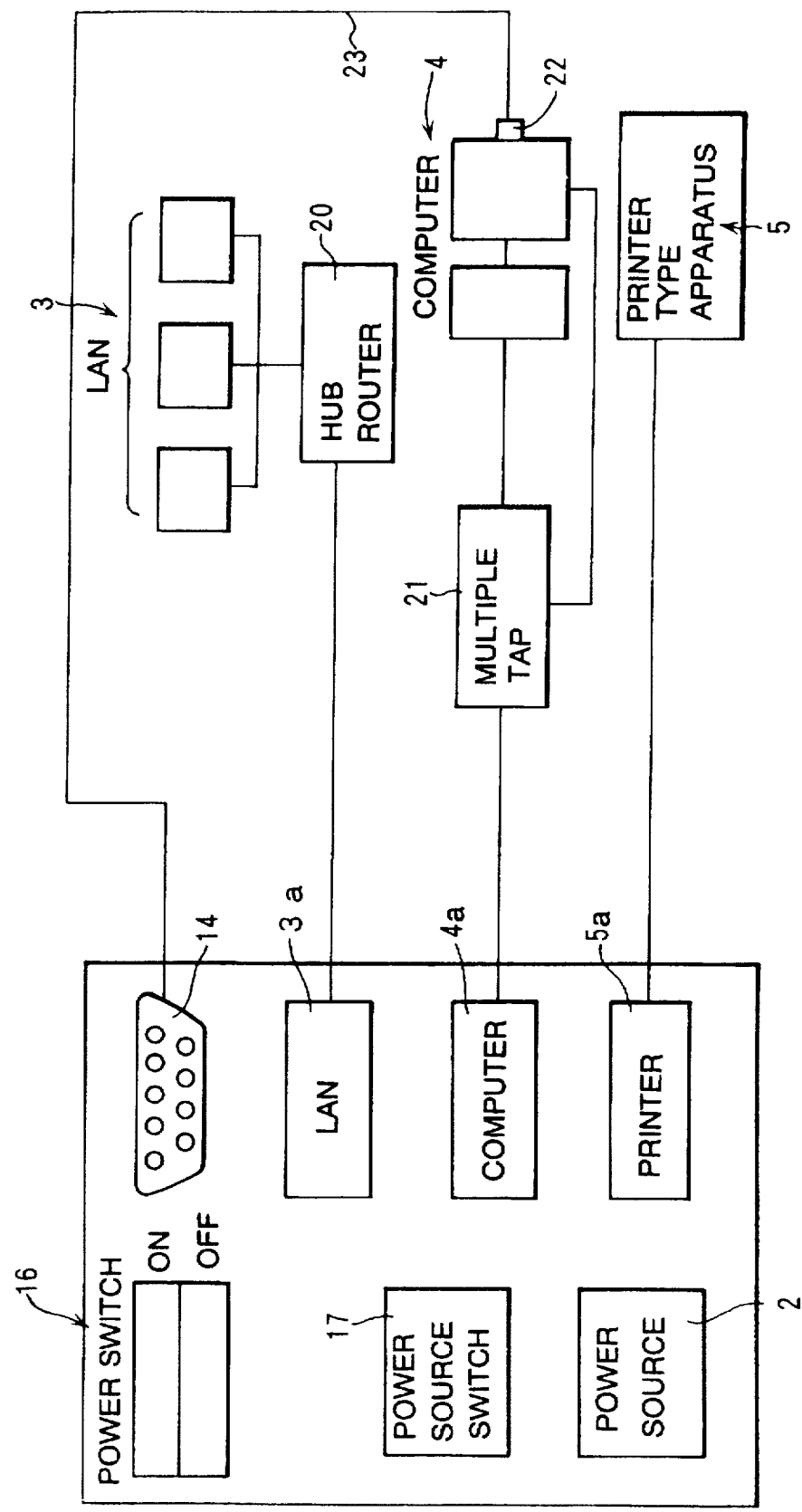
FIG. 2 is a schematic circuit diagram of the uninterruptible power supply control system of FIG. 1, showing an external appearance (at the front side face) of a UPS.
Figure 3:
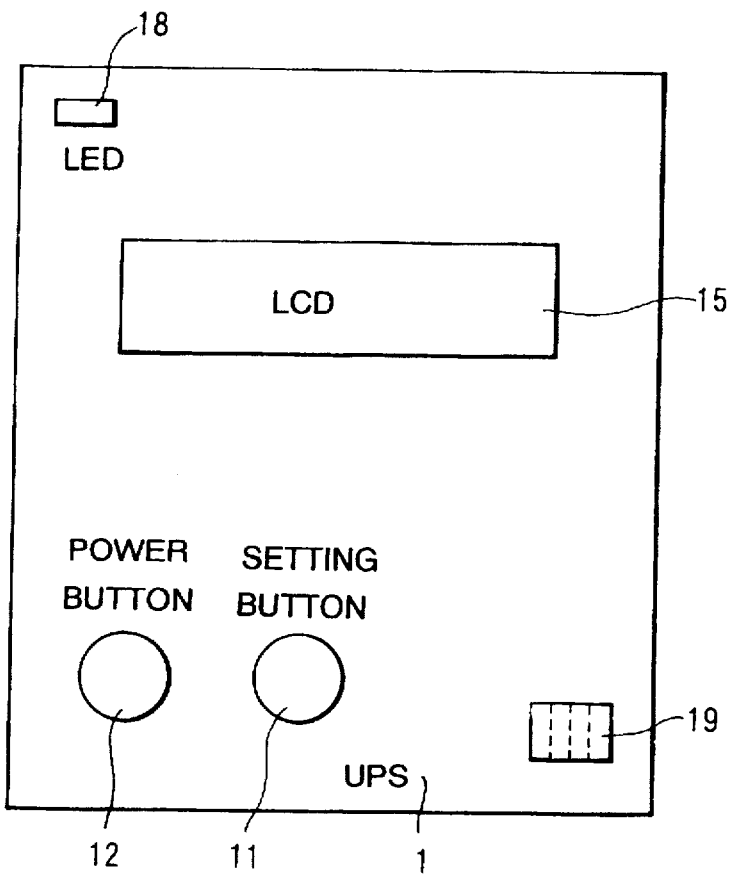
FIG. 3 is a back side view of the UPS of FIG. 2, showing an external appearance (at the back side face) of the UPS.

The UPS 1 has an external structure as shown in FIGS. 2 and 3, and is provided with a battery power source 7, a change-over switch 8, a timer switch 9, a relay 10, a setting button 11, a power button 12 and the like as shown in FIG. 1. The timer switch 9 forms part of a timer mechanism section for accomplishing a scheduling processing. Additionally, a remote device 14 having a circuit arrangement indicated by the reference numeral 13 is provided. Further, a LCD (liquid-crystal display) 15 is provided to display a schedule of operation of the computer 4 and the like.

As shown in FIGS. 2 and 3, the UPS 1 is constructed generally box-shaped and has a front side face at which output terminals 3a, 4a, 5a, a power switch 16 and a power source switch 17 are disposed as shown in FIG. 2. The output terminals 3a, 4a, 5a are electrically connected respectively to the LAN 3, the computer 4 and the printer 5. The LCD 15, the setting button 11, the power button 12 are disposed together with a LED (light emitting diode) 18 and a buzzer 19 at the rear side face of the box-shaped UPS I as shown in FIG. 3. As viewed in FIG. 2, in this embodiment, the LAN 3 includes a plurality of apparatuses which are electrically connected through a hub 20 to the output terminal 3a (for the LAN) of the UPS 1. The computer 4 is electrically connected through a multiple tap 21 to the output terminal 4a (for the computer) of the UPS 1. The remote device 14 is electrically connected to the computer 4 through, for example, a PC server 22 at the computer side and a RS-232C cable 23.

Next, function of the UPS 1 will be discussed in connection with the various apparatuses.

The LAN 3 includes the hub, router and the like, and is not allowed to be stopped in operation even for a moment. The power consumption of the LAN 3 is, for example, about 10W and therefore very low as compared with that (90W) of the computer 4 and that (200 W) of the printer 5. The remote device 14 is, for example, a RS232C connector and has, for example, 9 pins. The remote device 14 is electrically connected to the computer 4 through the computer-side PD server 22 and the ES-232C cable 23 as discussed above. The setting button 11 for setting an operating condition for the scheduled processing of the computer 4 and the like and adapted to set manually or automatically an operation start time, an operation stop time, an operation date, a term schedule and the like for the computer 4 and the like. The LCD 15 is adapted to display a content (or the operating condition) which has been scheduled, which content includes, for example, the present time, the operation start time, the operation stop time, the operation date, the term (week, month or year) schedule and the like. Additionally, the LCD 15 is adapted to display also as to whether a SD (shutdown) processing for the computer 4 has been made or not. The LCD 15 includes a ACON 24 which serves as a flashing lamp which warns a time at which the power source is to be switched ON or OFF. The buzzer 19 functions to warn the time at which the power source is to be switched OFF. The scheduling processing displayed on the LCD 15 is accomplished under control of the relay 10 and the timer switch 9 shown in FIG. 1. The LED 18 emits light during a normal power service in which the usual power source 2 functions, and is adapted to make a slow flashing during a power service interruption in which the battery power source 7 functions to operate the computer 4 and the like. The slow flashing of the LED 18 indicates that the battery power source 7 functions. The LED 18 further makes a quick flashing indicating application of an excessive load.

More specifically, the SD processing is carried out by the circuit arrangement 13 of the remote device 14, shown in FIG. 1. The circuit arrangement 13 is adapted to output a common output representing the normal operation of the computer 4 under the action of the battery power source (5 V) 7, a power service interruption signal representing a power service interruption, and a low voltage signal. The remote device 14 is arranged to automatically or manually control the time at which the computer 4 is stopped thereby preventing a quick stop of the computer 4. The setting button 11 functions to prolong a stopping term of the computer 4 by a predetermined time.

Subsequently, the electrical connection among the UPS 1, the power source 2, the LAN 3, the computer 4, the printer 5 and the like will be discussed with reference to FIGS. 1 and 2.

The UPS 1 includes the automatic constant-voltage regulator 6 which is electrically connected to the power source 2 through a connecting line (no numeral) from which a branch line (no numeral) is branched off and connected to the printer 5 through the timer switch 9. The change-over switch 9 is adapted to automatically make a changeover action of the power supply from the power source 2 to the battery power source 7 when the service power interruption occurs. When the power source is changed over from the power source 2 to the battery power source 7, the power supply to the printer 5 is interrupted. The LAN 3 is directly electrically connected to the output side of the change-over switch 8. The computer 4 is electrically connected to the output side of the change-over switch 8 through the timer switch 9. Accordingly, the LAN 3 and the computer 4 are kept in a condition to be connectable with the side of the battery power source 7.

The timer switch 9 is electrically connected to a timer mechanism section (as a controller) of the UPS 1 through a relay 10. The timer switch 9 is switched ON or OFF in accordance with the scheduled content displayed on the LCD 15. Thus, the computer 4 and the printer 5 are under control of the scheduling processing. The scheduling processing is controlled by the setting button 11, in which the scheduled content is displayed on the LCD 15. As discussed above, the computer 4 is connected to the remote device 14, so that the SD processing of the computer 4 is carried out under the action of the circuit arrangement 13 and the timer switch 9.

Assuming that the automatic constant-voltage regulator 6 is not provided, the voltage at the supply side varies within a range from 85 V to 125 V under the effect of output change in the apparatus at the output side. In order to prevent such a voltage variation, the automatic constant-voltage regulator 6 is provided in the uninterruptible power supply control system of the present invention, in which the voltage variation can be controlled, for example, within a range of 100±9 V thereby preventing a harmful influence due to the output change in the output side apparatus.

Next, a manner of operation of the above embodiment of the uninterruptible power supply control system will be discussed with reference to flowcharts of FIGS. 5 and 6.

First, the UPS 1, the LAN 4, the computer 4, the printer 5 and the power source 2 are electrically connected to each other as shown in FIG. 1. Thereafter, necessary data are input to the controller of the UPS 1 by using the setting button 11 and the power button 12. More specifically, the present time and day of the week are input. These data are not required to be changed after once input. Subsequently, input is made for the operation start time, the operation stop time, and the day of the week at which the scheduled processing is made. Thus, the above data are input to the controller of the UPS I and therefore the scheduled processing of the computer 4 and the printer 5 is made possible, so that the relay 10 is operated when predetermined times come thereby to supply power to the output terminals 4a, 5a for the computer 4 and the printer 5. At this time, the LAN 3 is directly supplied with power from the power source 2 through the change-over switch 8.

Here, operation of the scheduling processing will be first discussed with reference to FIG. 5.

At a step 100, a check is made as to whether a designated date has come or not. In case of NO, a flow returns to "START". In case of YES, a check is made as to whether a designated start time has come or not at a step 101. Here, In case of NO, the flow goes back to the step 102. In case of YES, a check is made as to whether the power source is switched ON or OFF at a step 102. In case of being switched ON, the flow goes to a step 103 at which the power source is switched ON. In case of OFF, a shutdown (SD) signal is output at a step 104, and then a power-off processing to switch the power source OFF is made at a step 105. Under the power source being switched ON, the scheduled processing is accomplished. Next, a check is made as to whether a designated stop time has come or not at a step 106. In case of NO, the flow goes back to the step 103. In case of YES, the power source is switched OFF at a step 107, thereby completing the operation of the scheduled processing. The above power-off processing at the step 105 is followed by the step 107 at which the power source is switched OFF.

Figure 4:
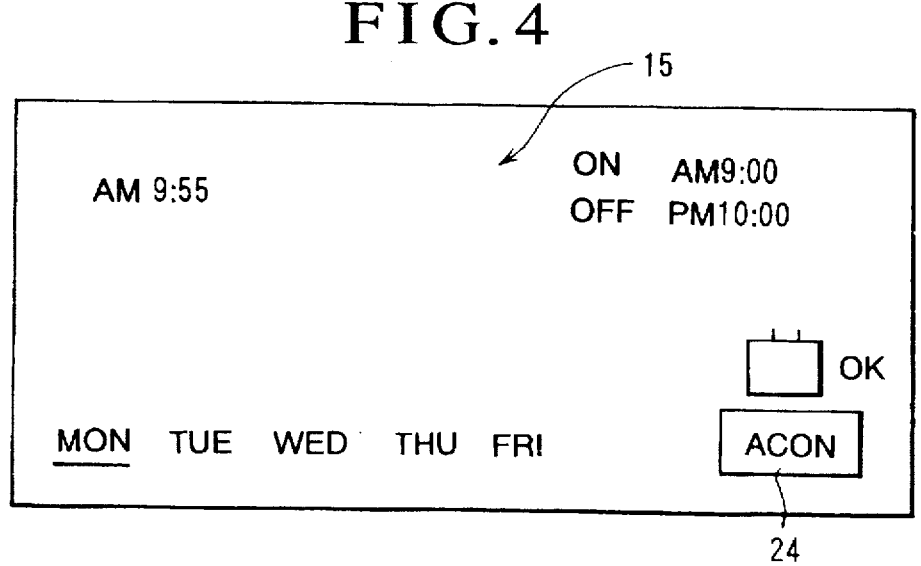
FIG. 4 is an enlarged view showing a displayed content on a LCD disposed at the back side face of the UPS.

FIG. 4 shows an example of the scheduled content displayed on the LCD 15, in which "AM 9:55" indicates the present time; "AM 9:00" indicates the operation start time; and "PM 10:00" indicates the operation stop time. Concerning the respective days of the week, the underlined day corresponds to the day at which the processing is made. Additionally, the ACON 24 is lit during the processing, while the LED 18 and the ACON 24 flash at a time before the operation stop time by a preset time, in which the buzzer 19 generates warning sound. By pressing the setting button 11, the operation stop time is delayed by a preset time. Additionally, in case that the operation start time is after the operation stop time, stopping the operation is executed even at the next day or at the day which is not scheduled. Further, the above day of the week at which the scheduled processing is made can be temporarily changed within a term (for example, one week) from the designated day, upon which the processing is made according to the original schedule upon lapse of the term. Above operations can be made manually or automatically.

Subsequently, operation will be discussed on a case that an abnormality of the power source occurs, with reference to a flowchart of FIG. 6.

First, a check is made as to whether the system is in an ON condition (switched ON) or not at a step 200. In case of NO, a flow returns to "START". In case of YES, a check is made as to whether the power source abnormality occurs or not at a step 201. In case of NO, the system is in the normal operation and therefore the flow goes to the operation in the flowchart of FIG. 5. In case of YES, a check is made as to whether a processing for waiting a power service recovering is being executed or not at a step 202. When the power source recovering is accomplished, the flow returns to "START". When the power source recovering is not accomplished, the flow goes to a step 203 at which the change-over switch 8 is actuated so that an electrical connection with the power source 2 is cut off, while an electrical connection with the battery power source 7 is established at a step 203. Thus, the LAN 3 is brought into direct connection with the battery power source 7 so as to be operated under an uninterrupted power supply condition. Additionally, the computer 4 is also brought into connection with the battery power source 7 to be operated at it is, however, the SD (shutdown) processing for the computer 4 is accomplished at the next step or step 204. Accordingly, the power supply to the computer 4 is stopped. At this time, the apparatus (for example, the printer 5) which is high in power consumption cannot be connected to the battery power source 7 so as to be stopped in operation.

The SD (shutdown) processing at the step 204 is accomplished as follows: First, the remote device 14 is operated to output a power service interruption signal. The power supply is changed over from the power source 2 to the battery power source 7, and then a low voltage signal is output. By this, the computer 4 is automatically stopped in operation; however, data processing is automatically executed until a time of the computer operation stopping thereby protecting the data stored in the computer 4. The LAN 3 is continuously operated during a time period in which the power of the battery power source 7 remains, under the action of the battery power source 7. It is to be noted that the power of the battery power source 7 is not largely consumed by the computer 4 and the printer 5 which are high in power consumption, so that the LAN 3 can be operated continuously in the complete uninterruptible power supply condition. After the SD processing is accomplished, the power supply to the computer 4 is interrupted as indicated at a step 205, so that only the LAN 3 is continuously operated as discussed above. If recovery of the power service interruption is not made, the computer 4 is automatically switched ON.

Figure 5:
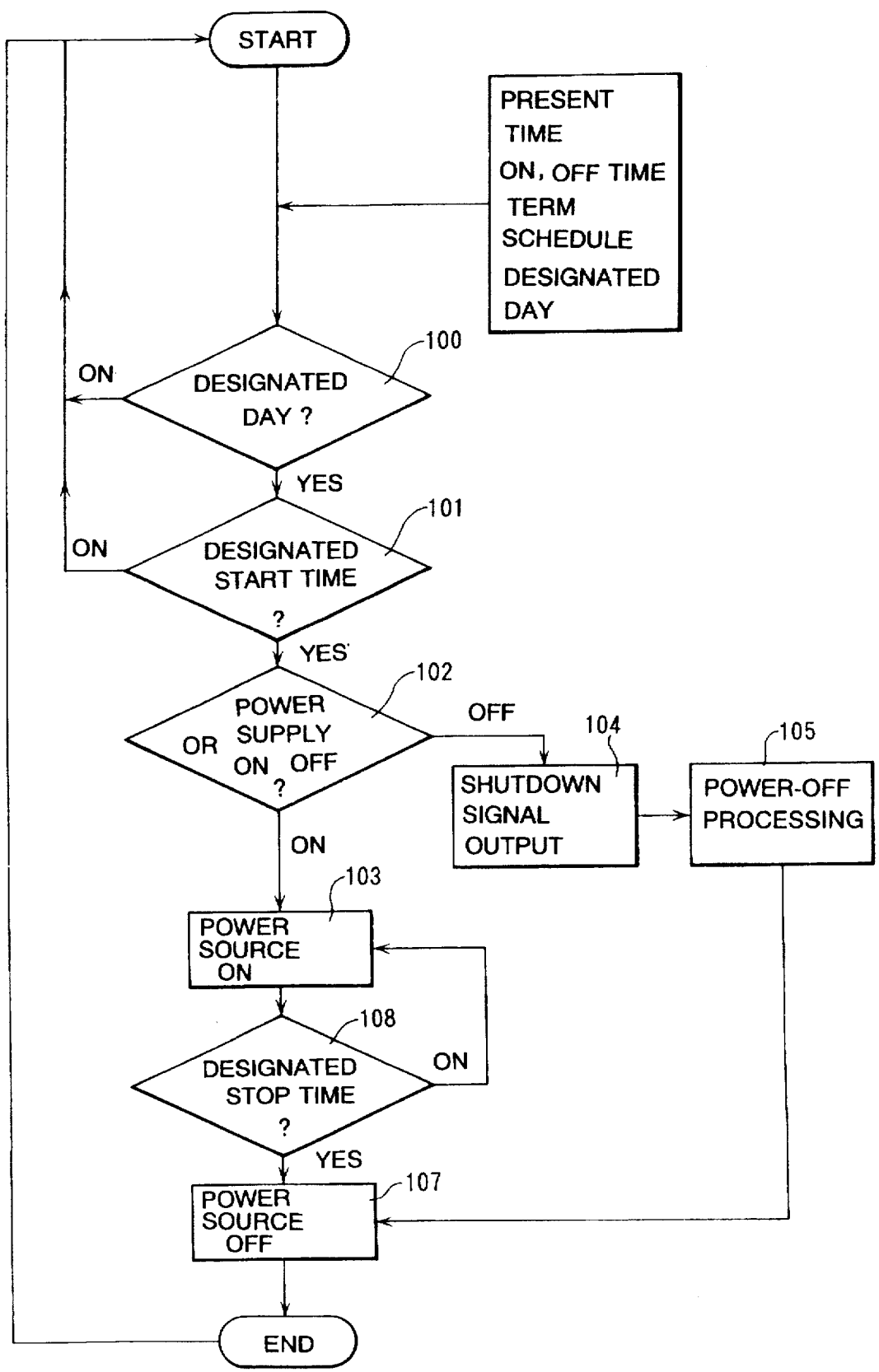
FIG. 5 is a flowchart showing a procedure of control of the uninterruptible power supply control system during a normal operation.
Figure 6:
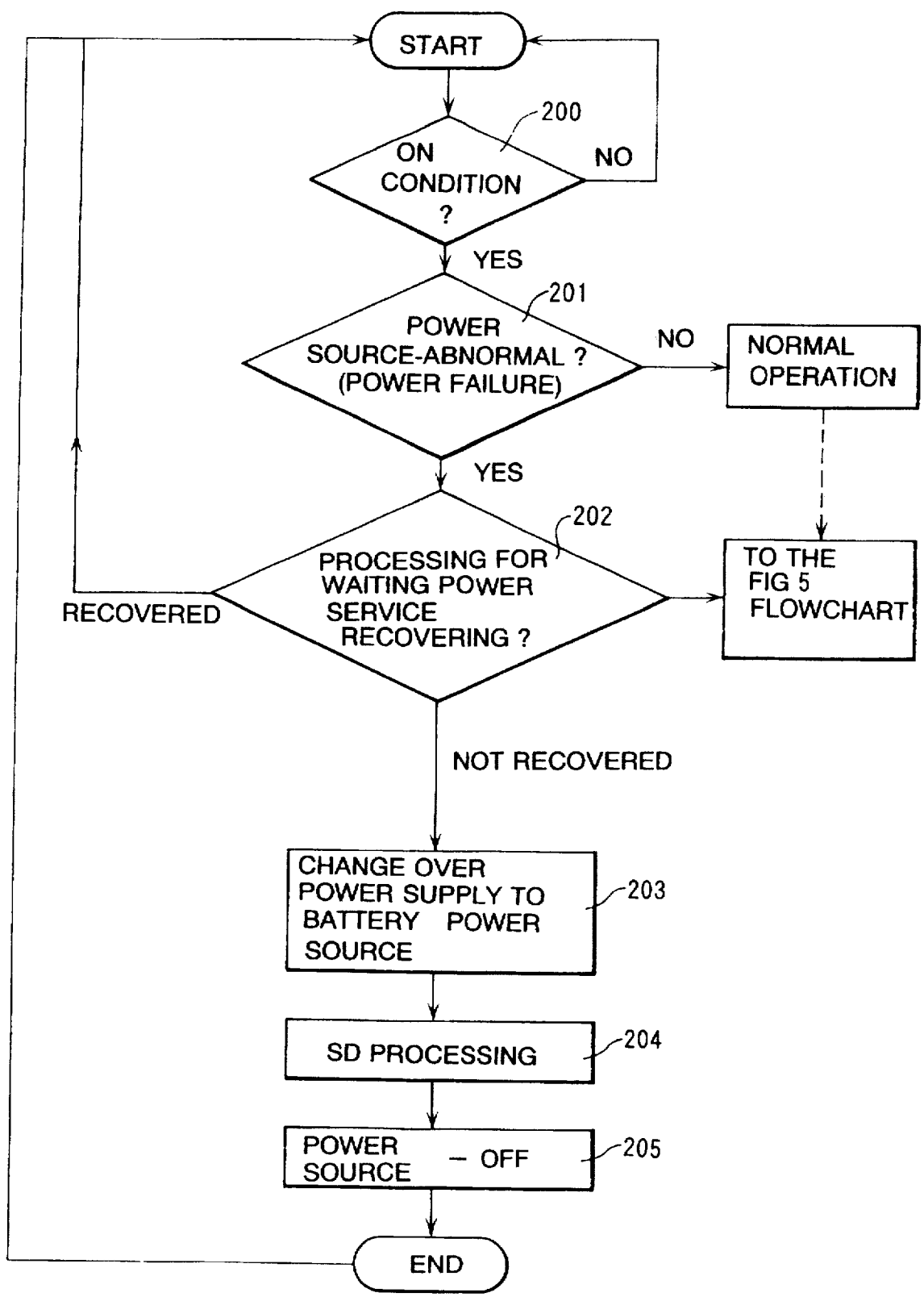
FIG. 6 is a flowchart showing a procedure of control of the uninterruptible power supply control system when an abnormality of a power source occurs.

While the embodiment of the uninterruptible power supply control system of the present invention has been shown and described as having a construction shown in FIGS. 1 to 4 and being operated in a manner shown in FIGS. 5 and 6, it will be understood that the present invention is not limited to the mode of the above discussed embodiment so that the electrical circuits shown in the drawings may be modified or otherwise arranged.

What is claimed is:

1. An uninterruptive power supply control system for a first apparatus, a second apparatus requiring a shutdown processing and a third apparatus not requiring the shutdown processing, comprising:

an uninterruptible power supply device which is connected to a power source and is also coupled to a battery, said uninterruptible power supply device including means for outputting a shutdown signal to the second apparatus when a power failure occurs, the second apparatus making its shutdown processing in response to the shutdown signal;

means for directly connecting said first apparatus to said battery so that said first apparatus is kept in an uninterrupted power supply condition;

means for connecting said second apparatus to said battery through a timer mechanism having a scheduling function so that said second apparatus is kept in the uninterrupted power supply condition; and means for connecting said third apparatus to said power source through said timer mechanism so that said third apparatus is prevented from largely consuming power.

2. An uninterruptible power supply control system as claimed in claim 1, wherein said first apparatus is an internet apparatus, said second apparatus is a CPU apparatus, said third apparatus is a printer apparatus.

3. An uninterruptible power supply control system as claimed in claim 2, wherein said internet apparatus includes at least one of LAN and WAN, said CPU apparatus includes a computer, and said printer apparatus includes at least one of a printer, a copying machine and a business machine for office work.

4. An uninterruptible power supply control system as claimed in claim 2, wherein said internet apparatus includes a plurality of apparatuses which are separate from each other, said CPU apparatus includes a plurality of apparatuses which are separate from each other, and said printer type apparatus includes a plurality of apparatuses which are separate from each other.

5. An uninterruptible power supply control system as claimed in claim 1, wherein said uninterruptible power supply device includes means for accomplishing a constant-voltage regulating function, said timer mechanism for accomplishing the scheduling function, said timer mechanism including means for controlling an operation start time, an operation stop time, a date of operation and a term schedule for said second apparatus, and means for accomplishing the shutdown processing by outputting an power service interruption signal and a low voltage signal for the battery when power supply is changed over from said power source to said battery.

6. An uninterruptible power supply control system as claimed in claim 1, wherein said uninterruptible power supply device includes a setting button for regulating an operation start time, an operation stop time, a date of operation and a term schedule for the second apparatus, and a display panel for displaying a present time, the operation start time, the operation stop time, the date of operation, the term schedule, the shutdown processing for the second apparatus.

7. An uninterruptible power supply control system as claimed in claim 6, wherein said setting button has a function to change the operation stop time.

8. An uninterruptible power supply control system as claimed in claim 1, wherein said uninterruptible power supply device includes at least one of means by which a lamp flashes at a time before the operation stop time by a predetermined time, and means by which a warning is made at said time.

* * * * *